(12) United States Patent
Graf (10) Patent No.: US 11,930,796 B1
(45) Date of Patent: Mar. 19, 2024

(54) FISHING LURE

(71) Applicant: Daniel Edward Graf, Hamilton, OH (US)

(72) Inventor: Daniel Edward Graf, Hamilton, OH (US)

(*) Notice: Subject to any disclaimer, the term of this patent is extended or adjusted under 35 U.S.C. 154(b) by 0 days.

(21) Appl. No.: 18/122,576

(22) Filed: Mar. 16, 2023

Related U.S. Application Data (60) Provisional application No. 63/433,887, filed on Dec. 20, 2022.

(51) Int. Cl.
*A01K 85/01* (2006.01)
*A01K 85/00* (2006.01)

(52) U.S. Cl.
CPC .......... *A01K 85/012* (2022.02); *A01K 85/015* (2022.02)

(58) Field of Classification Search
CPC ...... A01K 85/00; A01K 85/01; A01K 85/011; A01K 85/012; A01K 85/013; A01K 85/1803; A01K 85/1837; A01K 85/1847; A01K 85/16
USPC ........... 43/42.32, 42.33, 42.34, 42.35, 42.47, 43/42.31, 42.39
See application file for complete search history.

(56) References Cited

U.S. PATENT DOCUMENTS

| | | | | |
|---|---|---|---|---|
| 1,249,194 A | * | 12/1917 | Race | A01K 85/16 43/42.49 |
| 1,892,892 A | * | 1/1933 | Jamar, Jr. | A01K 85/18 43/42.35 |
| 2,028,050 A | * | 1/1936 | De Witt | A01K 85/16 43/42.36 |
| 2,112,385 A | * | 3/1938 | Smith | A01K 85/16 43/41 |
| 2,218,421 A | * | 10/1940 | Edgar | A01K 85/16 43/42.22 |
| 2,288,595 A | | 7/1942 | Peterson | |

(Continued)

FOREIGN PATENT DOCUMENTS

AU 736865 B2 * 8/2001
DE 1657076 A1 * 8/1970

(Continued)

OTHER PUBLICATIONS

Allard, Tim, Battle Murky Water with Glitter Baits, Bass Pro Shops, https://1source.basspro.com/news-tips/fishing-tackle/6380/battle-murky-water-glitter-baits, Jun. 16, 2014, 3 pages.

*Primary Examiner* — Darren W Ark
(74) *Attorney, Agent, or Firm* — Daniel F. Nesbitt; Nesbitt IP LLC (57) ABSTRACT

A fish lure having a light-transparent, plastic body having a non-transparent coating of a paint or film over a portion of the upper surface of the lure body and one or more uncovered portions that permit light, such as sunlight, to pass through the lure body, and be visible from the underside and opposed sides of the lure. The body also contains a transparent liquid containing glitter pieces, and the allowed sunlight reflects off the glitter pieces despite the presence of the non-transparent coating covering portions of the lure body. The body can also have a sealable lower chamber filled with the liquid containing glitter pieces, and a sealable upper chamber filled with a gas that provides buoyancy to float the lure on the surface of a water body, horizontal and upright along the surface of the water body.

21 Claims, 4 Drawing Sheets

(56) References Cited

U.S. PATENT DOCUMENTS

| | | | | |
|---|---|---|---|---|
| 2,302,206 A * | 11/1942 | Gibson | A01K 83/06 | 43/41 |
| 2,309,521 A * | 1/1943 | Mabee | A01K 85/16 | 43/42.53 |
| 2,467,244 A * | 4/1949 | Van Hee Achiel | A01K 85/16 | 43/42.06 |
| 2,488,678 A * | 11/1949 | Nardi | A01K 85/16 | 43/42.31 |
| 2,573,592 A * | 10/1951 | Nickel | A01K 85/16 | 43/42.22 |
| 2,598,360 A * | 5/1952 | Cummins | A01K 85/16 | 43/42.49 |
| 2,691,839 A * | 10/1954 | Duerig | A01K 85/16 | 43/42.32 |
| 2,740,220 A * | 4/1956 | Caplan | A01K 85/01 | 43/42.34 |
| 2,741,864 A * | 4/1956 | Shotton | A01K 97/02 | 43/42.31 |
| 2,733,535 A * | 5/1956 | Rosen | A01K 85/16 | 43/42.34 |
| 2,796,694 A * | 6/1957 | Turner | A01K 85/16 | 43/42.12 |
| 2,884,732 A * | 5/1959 | Bailer | A01K 85/16 | 43/42.33 |
| 2,897,623 A * | 8/1959 | Flournoy | A01K 85/01 | 43/17.6 |
| 2,938,294 A * | 5/1960 | Bachmann | A01K 85/08 | 43/42.35 |
| 3,040,462 A * | 6/1962 | Guida | A01K 85/01 | 43/42.31 |
| 3,367,060 A * | 2/1968 | Abercrombie | A01K 85/16 | D22/133 |
| 3,505,754 A * | 4/1970 | Lawlor | A01K 85/16 | 43/42.22 |
| 3,716,937 A * | 2/1973 | Santosuosso | A01K 85/16 | 43/42.32 |
| 3,748,772 A * | 7/1973 | Gravitt | A01K 85/16 | 43/41 |
| 3,762,092 A * | 10/1973 | Bercz | A01K 85/01 | 43/44.87 |
| 3,879,883 A * | 4/1975 | Strader | A01K 85/16 | 43/42.32 |
| 3,885,340 A * | 5/1975 | Volenec | A01K 85/16 | 43/42.21 |
| 3,894,350 A * | 7/1975 | Parker | A01K 85/01 | 43/42.31 |
| 3,895,455 A * | 7/1975 | Johnston | A01K 85/01 | 43/17.6 |
| 4,214,396 A * | 7/1980 | Firmin | A01K 85/00 | D22/127 |
| 4,250,651 A * | 2/1981 | Ramme | A01K 85/01 | 43/42.35 |
| 4,257,182 A * | 3/1981 | Thom | A01K 85/16 | 43/42.35 |
| 4,266,360 A * | 5/1981 | Smith | A01K 85/16 | 43/42.48 |
| 4,283,876 A * | 8/1981 | Volenec | A01K 85/16 | 43/42.33 |
| 4,437,256 A * | 3/1984 | Kulak | A01K 85/01 | 43/42.22 |
| 4,610,103 A * | 9/1986 | Steinman | A01K 85/01 | D22/133 |
| 4,638,584 A * | 1/1987 | Lindsay | A01K 85/01 | 43/42.31 |
| 4,700,504 A * | 10/1987 | Mattison | A01K 85/16 | 43/42.47 |
| 4,741,120 A * | 5/1988 | Cota | A01K 85/01 | 43/17.5 |
| 4,787,167 A * | 11/1988 | Wroclawski | A01K 85/01 | 43/42.32 |
| 4,823,497 A * | 4/1989 | Pierce | A01K 85/01 | 43/44.99 |
| 4,823,502 A * | 4/1989 | Tucker | A01K 85/00 | D22/128 |
| 4,841,664 A * | 6/1989 | Baldwin | A01K 85/16 | 43/41 |
| 4,912,871 A * | 4/1990 | Brady | A01K 85/00 | 43/42.4 |
| 4,956,934 A * | 9/1990 | Dahl | A01K 85/00 | 43/42.31 |
| 4,972,623 A * | 11/1990 | Delricco | A01K 85/01 | 43/17.6 |
| 5,044,110 A * | 9/1991 | Henderson | A01K 85/14 | 43/42.31 |
| 5,245,782 A * | 9/1993 | Pahle | A01K 85/00 | 43/42.34 |
| 5,408,780 A * | 4/1995 | Chambers, Sr. | A01K 85/00 | 43/42.32 |
| 5,444,935 A * | 8/1995 | Pahle | A01K 85/00 | 43/42.06 |
| 5,465,524 A * | 11/1995 | Vallone | A01K 85/01 | 43/42.32 |
| 5,564,220 A * | 10/1996 | Blicha | A01K 85/00 | 43/42.32 |
| 5,566,494 A * | 10/1996 | Zimmer | A01K 85/16 | 43/42.31 |
| 5,827,551 A * | 10/1998 | Prochnow | A01K 85/01 | 426/89 |
| 6,029,388 A * | 2/2000 | Yokogawa | A01K 85/01 | 43/17.5 |
| 6,131,328 A * | 10/2000 | Menne | A01K 85/16 | 43/42.22 |
| 6,190,654 B1 * | 2/2001 | Hukee | A01K 97/02 | 424/407 |
| 6,202,337 B1 * | 3/2001 | Yoshida | A01K 85/16 | 43/42.31 |
| 6,647,659 B1 * | 11/2003 | King | A01K 85/01 | 43/17.6 |
| 6,671,995 B1 * | 1/2004 | Harkin | A01K 85/01 | 43/17.5 |
| 7,520,085 B2 * | 4/2009 | Edwards | A01K 85/01 | 43/42.48 |
| 8,091,270 B2 * | 1/2012 | Senter | A01K 85/00 | 43/17.6 |
| 8,567,109 B1 * | 10/2013 | Grigorovich | A01K 85/01 | 43/42.22 |
| 8,745,915 B2 * | 6/2014 | McManigal | A01K 85/01 | 43/42.31 |
| 11,470,831 B1 * | 10/2022 | Rudy | A01K 85/018 | |
| 11,641,849 B2 * | 5/2023 | Moe | A01K 85/01 | 43/42 |
| 2002/0043016 A1 * | 4/2002 | Kechriotis | A01K 85/16 | 43/42.22 |
| 2002/0174593 A1 * | 11/2002 | Siirtola | A01K 85/16 | 43/42.53 |
| 2003/0093939 A1 | 5/2003 | Salonen et al. | | |
| 2004/0244265 A1 * | 12/2004 | Miyata | A01K 85/01 | 43/17.6 |
| 2005/0178044 A1 * | 8/2005 | Stechschulte | A01K 85/16 | 43/42.32 |
| 2006/0010763 A1 * | 1/2006 | Podlewski | A01K 85/16 | 43/42.31 |
| 2006/0207160 A1 * | 9/2006 | Edwards | A01K 85/01 | 43/17.6 |
| 2006/0230670 A1 * | 10/2006 | Thomas | A01K 85/16 | 43/42.48 |
| 2007/0199233 A1 * | 8/2007 | Higgin | A01K 85/16 | 43/42.31 |
| 2008/0148622 A1 * | 6/2008 | Ashby | A01K 85/01 | 43/17.6 |
| 2008/0263934 A1 * | 10/2008 | Hanson | A01K 85/00 | 426/1 |
| 2008/0289241 A1 * | 11/2008 | Hawryshyn | A01K 85/01 | 43/17.6 |
| 2009/0000177 A1 * | 1/2009 | Johnson | A01M 31/06 | 43/42.32 |
| 2009/0007480 A1 * | 1/2009 | Braun | A01K 85/16 | 43/17.1 |

(56) References Cited

U.S. PATENT DOCUMENTS

| | | | |
|---|---|---|---|
| 2009/0056196 A1* | 3/2009 | Korteweg | A01K 85/01 43/42.24 |
| 2009/0126256 A1 | 5/2009 | Gregory | |
| 2011/0056113 A1 | 3/2011 | Sebile | |
| 2011/0239521 A1* | 10/2011 | Tsai | A01K 85/18 43/42.47 |
| 2011/0296737 A1* | 12/2011 | Peluso | A01K 85/16 43/42.32 |
| 2012/0005944 A1* | 1/2012 | Carswell | A01K 85/00 43/42.3 |
| 2012/0102816 A1* | 5/2012 | Newman | A01K 97/04 43/44.2 |
| 2013/0145673 A1* | 6/2013 | Babcock, III | A01K 85/01 43/42.53 |
| 2013/0333272 A1* | 12/2013 | Gravelle | A01K 85/01 43/42.32 |
| 2016/0007581 A1* | 1/2016 | Davidson | G02B 13/06 359/809 |
| 2016/0120159 A1* | 5/2016 | Tsybulnyk | A01K 85/01 43/26.2 |
| 2017/0086434 A1* | 3/2017 | Locker | A01K 85/00 |
| 2017/0099820 A1* | 4/2017 | Decker | A01K 99/00 |
| 2017/0295764 A1* | 10/2017 | Pillard, Jr. | A01K 85/01 |
| 2018/0014516 A1* | 1/2018 | Van Reenen | A01K 85/01 |
| 2019/0021299 A1* | 1/2019 | Fishback, Jr. | A01K 85/00 |
| 2020/0085024 A1* | 3/2020 | Staton | A01K 85/01 |
| 2020/0375164 A1* | 12/2020 | Moe | A01K 85/01 |
| 2022/0394962 A1* | 12/2022 | Medinas | A01K 85/018 |
| 2023/0031006 A1* | 2/2023 | Yagi | A01K 85/012 |
| 2023/0065290 A1* | 3/2023 | Yagi | A01K 85/013 |
| 2023/0180729 A1* | 6/2023 | Kerry | A01K 85/1867 43/42.24 |

FOREIGN PATENT DOCUMENTS

| | | | | |
|---|---|---|---|---|
| DE | 29606802 U1 * | 8/1997 | | A01K 85/16 |
| DE | 202015005333 U1 * | 12/2015 | | A01K 85/01 |
| DE | 202020105288 U1 * | 11/2020 | | |
| EP | 0845209 A1 * | 6/1998 | | |
| EP | 0947133 A1 | 10/1999 | | |
| FR | 2728432 A1 | 6/1996 | | |
| FR | 2835149 A3 * | 8/2003 | | A01K 85/16 |
| FR | 2888720 A1 | 1/2007 | | |
| FR | 3017270 B1 * | 4/2017 | | A01K 85/005 |
| GB | 1563973 A * | 4/1980 | | A01K 85/16 |
| GB | 2415348 A * | 12/2005 | | A01K 85/01 |
| JP | 2003061516 A | 3/2003 | | |
| JP | 2006197902 A * | 8/2006 | | |
| JP | 2008182994 A * | 8/2008 | | |
| JP | 2008283876 A * | 11/2008 | | |
| JP | 2009038992 A * | 2/2009 | | |
| JP | 2010068712 A * | 4/2010 | | |
| JP | 2010154762 A * | 7/2010 | | |
| JP | 2014008064 A * | 1/2014 | | A01K 85/00 |
| JP | 2014121285 A * | 7/2014 | | |
| JP | 2014161232 A * | 9/2014 | | |
| JP | 5613932 B1 * | 10/2014 | | A01K 85/00 |
| JP | 2017023108 A * | 2/2017 | | |
| JP | 2017051144 A * | 3/2017 | | |
| JP | 2021078383 A * | 5/2021 | | |
| JP | 3233194 U * | 7/2021 | | |
| JP | 6899058 B1 * | 7/2021 | | |
| KR | 20010095801 A * | 11/2011 | | |
| KR | 101472038 B1 * | 12/2014 | | |
| WO | WO-8606584 A1 * | 11/1986 | | |
| WO | 92/07462 A1 | 5/1992 | | |
| WO | WO-9831218 A1 * | 7/1998 | | A01K 85/01 |
| WO | WO-0168824 A2 * | 9/2001 | | C07K 14/43595 |
| WO | WO-2004014132 A1 * | 2/2004 | | A01K 85/01 |
| WO | WO-2007037861 A2 * | 4/2007 | | A01K 85/00 |
| WO | 2009007423 A2 | 1/2009 | | |
| WO | 2009007425 A2 | 1/2009 | | |
| WO | WO-2009007423 A2 * | 1/2009 | | A01K 85/01 |
| WO | WO-2009007425 A2 * | 1/2009 | | A01K 85/01 |
| WO | WO-2009040910 A1 * | 4/2009 | | A01K 85/01 |
| WO | WO-2012153385 A1 * | 11/2012 | | A01K 85/00 |
| WO | WO-2015095871 A1 * | 6/2015 | | A01K 85/00 |
| WO | WO-2021241661 A1 * | 12/2021 | | |

* cited by examiner

FISHING LURE

CROSS-REFERENCE TO RELATED APPLICATIONS

This application claims the benefit of U.S. Provisional Patent Application No. 63/433,887, filed Dec. 20, 2022, the disclosure of which is incorporated by reference.

BACKGROUND OF THE INVENTION

A fish lure is a type of artificial fish bait which is designed to attract a fish's attention. The lure can use movement, vibration, flash and color to bait fish. Many lures are equipped with one or more hooks that are used to catch a fish when it takes into its mouth, or strikes, the lure. Some lures are placed to attract fish so a spear can be impaled into the fish or so the fish can be captured by hand. Most lures are attached to the end of a fish line and have various steles of hooks attached to the body and are designed to elicit a strike resulting in a hookset.

There are a variety of options for fish lures and bait. Depending on the fish and/or the person fishing, real bait such as worms, small fish, or bugs may be used. Other fish and/or fishermen prefer lures that simulate real bait. Such lures may have a body shape that mimics a bait fish. However, body shape alone is typically insufficient for attracting the desired fish. A non-limiting example of fish lures in described in the following patents and publications: U.S. Pat. Nos. 2,288,595, 2,598,360, 3,879,883, 4,823,502, 4,956,934, 5,044,110, US Application Publications 2009/0126256 and 2011/0056113, International Patent Publications WO1992/007462, WO2009/007423 and WO2009/007425, European patent EP 0947133, and French Patents 2,728,432 and 2,888,720, the disclosures of which are incorporated by reference in their entireties.

Typically, fish lures are utilized in primarily sport fishing in which the user can enjoy the thrill of luring in individual fish utilizing a variety of different fishing strategies. Traditionally, fish lures are purchased in stock configurations from fish lure manufacturers. Stock fish lure configurations provide a variety of different colors, sizes and shapes, allowing a user to switch between different lures in the event that one lure is unsuccessful, or to catch different sizes or numbers of fish in a particular ocean, lake, or stream environment. The challenge for any fisherman is to select a design and style of lure that will be effective for a particular fishing conditions. What has been lacking is a lure of a design and style that is effective in a variety of circumstances, allowing the angler to be more productive in many more fishing conditions.

SUMMARY OF THE INVENTION

The present invention provides a fish lure having a body made of a light-transparent material, and having a non-transparent coating of a paint or film over a portion of the upper surface of the lure body and one or more uncovered portions that permit light, such as sunlight, to pass through the lure body, and be visible from the underside and opposed sides of the lure.

The body also contains a transparent liquid containing glitter pieces, and the allowed sunlight reflects off the glitter pieces despite the presence of the non-transparent coating covering portions of the lure body.

The body can also have a sealable lower chamber filled with the liquid containing glitter pieces, and a sealable upper chamber filled with a gas that provides buoyancy to float the lure on the surface of a water body, horizontal and upright along the surface of the water body.

In an embodiment, a fish lure comprises a lure body made of a transparent plastic, having an elongated shape, an upper areal surface and opposed side surfaces, and a non-transparent coating that covers at least a portion of the upper areal surface of the lure body and does not cover one or more uncovered portions of the upper areal portion of the transparent plastic wall that are transparent to light.

In various embodiments, the non-transparent coating comprises a paint or film.

In various embodiments, the one or more uncovered portions comprise one or more uncovered elongated striped areas, and in some embodiments, the one or more uncovered elongated striped areas comprises an uncovered elongated stripe along the longitudinal centerline of the upper areal surface of the lure body.

In various embodiments, the one or more uncovered portions comprise a plurality of spot areas, preferably having an equivalent diameter of less than about 10 mm, and an average equivalent diameter of between 1 mm and 5 mm.

In various embodiments, the lure body comprises an enclosed chamber, and the fish lure further includes a light-transparent liquid contained in the chamber, and a particulate material contained within the liquid. In various embodiments, the particulate material comprises a multiplicity of highly-reflective planar glitter pieces.

In various embodiments, the transparent liquid comprises water and 1%-75%, preferably about 15% to 35%, glycerin by volume of the transparent liquid.

In another embodiment, or in combination with the one embodiment above, a fish lure comprises a lure body made of a transparent plastic having an elongated shape and an upper areal surface, the lure body comprising: i) a sealed upper chamber containing a gas, and ii) a lower chamber.

In various embodiments, the upper chamber contains only a gas.

In some embodiments thereof, the lower chamber can be sealable, and in some embodiments thereof, the lower chamber is sealed and contains a light-transparent liquid. In some embodiments thereof, a light-transparent, transverse wall divides the chamber into the upper chamber and the lower chamber.

In various embodiments, the upper chamber extends along the length of the lure body to provide the same buoyancy a front end and a back end of the lure body.

In various embodiments, the lure body consists of a first half shells and a second half shell that is a mirror image of the first half shell, each half shell comprising a peripheral wall that includes a peripheral edge that defines main cavity, and a dividing half wall that includes a peripheral edge that is joined along a portion of an interior surface of the lure body, near the upper portion of the lure body, and a distal edge, to divide the main cavity into an upper cavity and a lower cavity, wherein the respective peripheral edges of the first half shell and second half shell have a surface that is sealed together to form a main chamber, and the respective dividing half walls are sealed together along the respective distal edges to form the dividing wall that divides the main chamber into the upper chamber and the sealable lower chamber.

In various embodiments, the respective peripheral edges of the peripheral wall and the dividing wall of the first and second half shells have mating surfaces.

While the present specification illustrates the fish lure and lure body as a crankbait (also known as plugs), it can be understood by person of skill in the art that the elements and features of the present invention can be incorporated into all style and versions of fish lures. For example, the elements and features can be applied to each of the types of diving depths of crankbait lures, including wake baits, shallow diver, medium diver, deep diver, and extra deep diver crankbaits. The element and features can be applied to lures with sound production, such as rattlers, and can be applied to lipless or lipped crankbait lures. The elements and features can be applied to other types of lures including, but not limited to, jigs, poppers, spooks, spinnerbait, and spoons, and as described at https://en.wikipedia.org/wiki/Fishing_lure, the disclosure of which is incorporated by reference in its entirety.

DETAILED DESCRIPTION OF THE INVENTION

Figures 1, 2, 3:
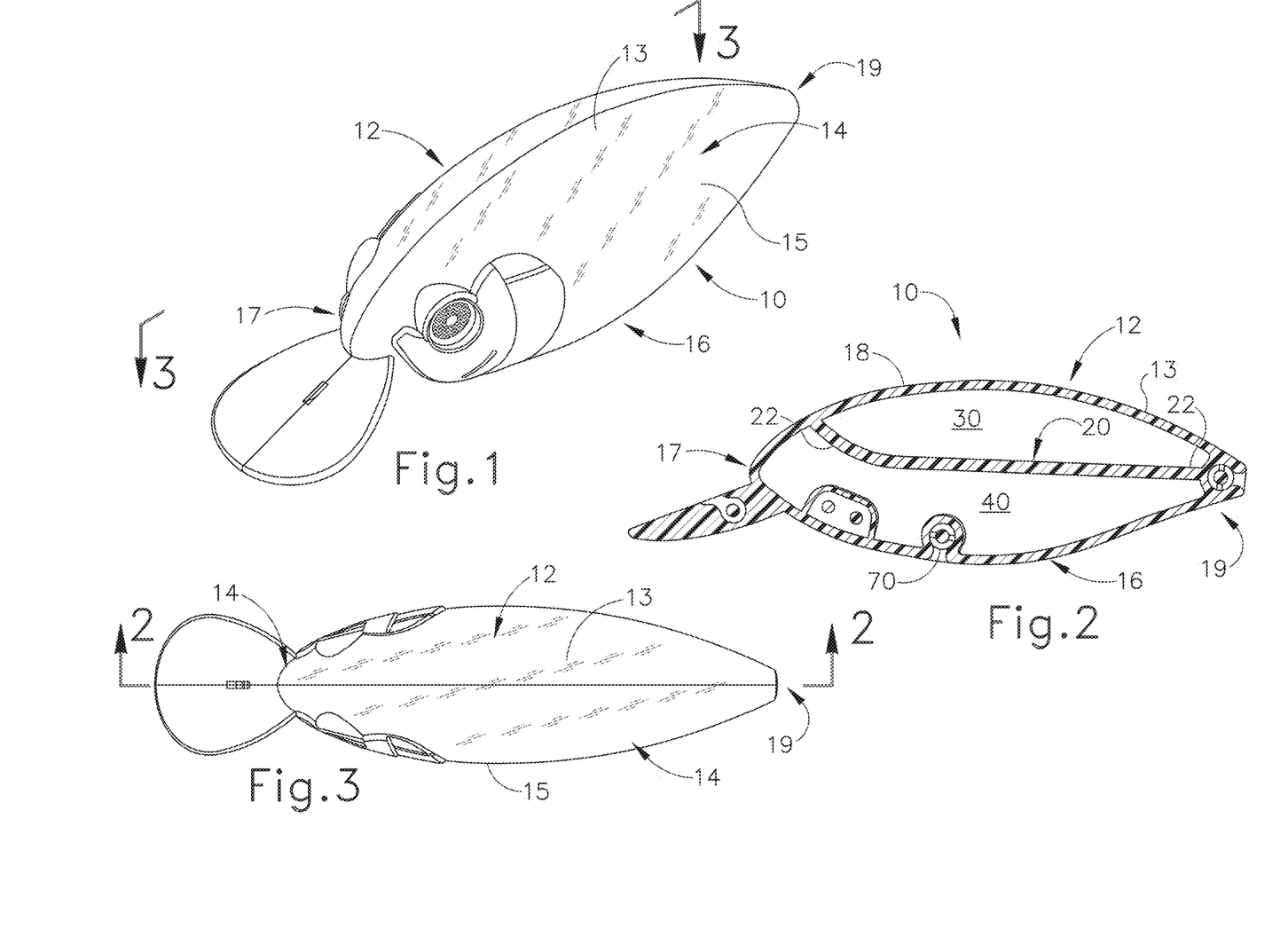
FIG. 1 shows a perspective view of a lure body of the present invention.
FIG. 2 shows a sectional view along the vertical centerline of the lure body of FIG. 1, showing an upper chamber and lower chamber.
FIG. 3 shows a top plan view of the lure body.

A lure body 10 for a fish lure 1 is shown in perspective front view in FIG. 1, and in FIGS. 1 and 2. The lure body 10 having an elongated longitudinal shape and a circular or oval shaped lateral cross section. The lure body 10 has an upper wall portion 12 having an upper areal surface 13, opposed sides wall portions 14 having opposed lateral side surfaces 15 that are integral with the upper wall portion 12, and a bottom wall portion 16 having a bottom surface that is integral with the opposed side wall portions 14. The lure body 10 is formed of a transparent plastic wall 18 that encloses one or more chambers. The plastic material is transparent and resilient.

Multi-Chambered

In the embodiment shown in FIG. 3, the lure body 10 also has a dividing wall 20 that divides the interior space of the lure body 10 into an upper chamber 30 and a lower chamber 40. The upper chamber 30 is typically sealed, but can be sealable, and the lower chamber 40 can be sealed or is sealable. The dividing wall 20 has a peripheral edge 22 that is joined to and along an interior surface of the wall 18 of the lure body 10, from proximate the front end 17 to the rear end 19. The dividing wall 20 typically is joined to the side wall portions 14 and/or the upper wall portion 12 of the lure body.

To provide a sealable or selectively sealed chamber, an exterior wall of either the upper or lower chamber can have a port hole formed therethrough, and a sealing element can be fitted into or secured there within. In some embodiments, the sealing element can be a elastomeric plug, such as a plug made of rubber or silicon, than can be extracted from and inserted securely back into the port hole. The sealing element can also be a permanent sealant, such as an epoxy or curable adhesive material that hardens after curing by time exposure or temperature. Non-limiting examples of a sealing element are described in U.S. Pat. No. 4,956,934, the disclosure of which is incorporated by reference in its entirety.

The upper chamber 30 contains a gas, and preferably a dry gas that has a low content or no vapor that can condense at even cold atmospheric temperature, such as moisture. Typically, the gas is dry air having a low moisture content. The gas-filled upper chamber 30 provides a buoyancy element for the fish lure that allows the fish lure to float on the surface of a water body. In the illustrated embodiment, and in various embodiments, the upper gas-filled chamber 30 extends along most or all of the length of the upper wall portion 12 of the lure body 10. In some embodiments, the volume of the upper chamber should be sufficient, relative to the total volume of the lure body, with the lower chamber filled with the transparent liquid, to allow the front end and the back end of the lure body to have the same buoyancy, and to float substantially horizontally along the surface of the body of water.

The lure body can have a vertical plane of symmetry shape along its length.

The volume within the upper chamber 30 is at least about 10% of the sum of the volumes of the upper chamber 30 and the lower chamber 40. In some embodiments, the upper chamber volume is up to about 80% of the sum volumes. In some embodiments, the upper chamber volume is at least 10%, or at least 30%, or at least 40%, or at least 50%, and up to about 70%, or up to about 60%, or up to about 50%, or up to about 40%, of the sum volumes.

As manufactured, the lure body 10, made of light-transparent plastic wall material, passes rays of lights, for example sunlight, through the wall 18 of the upper wall portion 12, the upper chamber 30, the dividing wall 20, the lower chamber 40, and the bottom wall portion 16, and is visible from the underside of the lure body 10.

Figures 4, 5, 6:
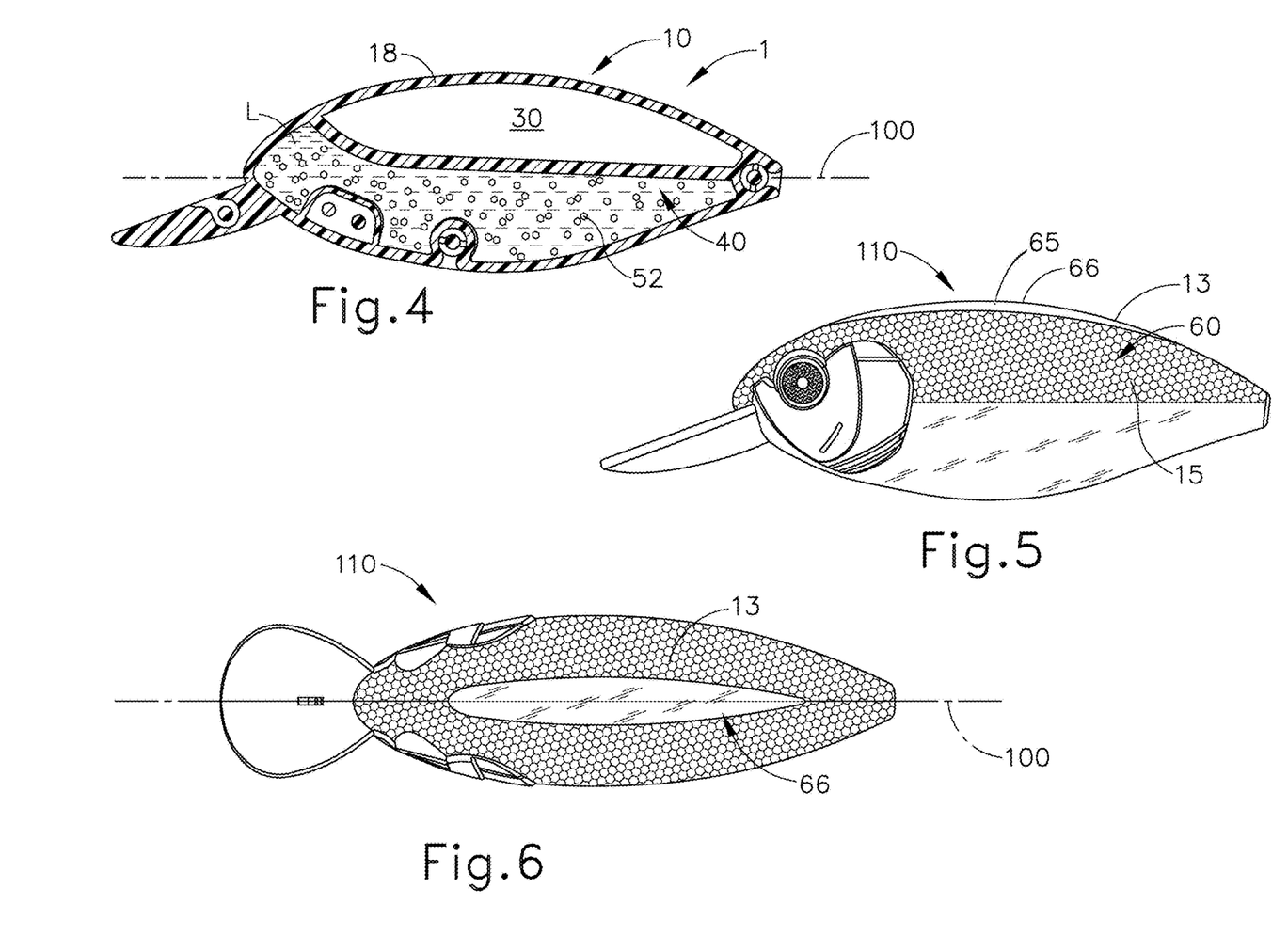
FIG. 4 shows the lure body of FIG. 2 with a transparent liquid with reflective glitter, contained within the lower chamber.
FIG. 5 shows a side elevation view of the lure body.
FIG. 6 shows a top plan view of another embodiment of a lure body having a light-transparent window within an opaque coating.

As shown in FIG. 4, the lower chamber 40 is sealed and contains a light-transparent liquid L, typically an aqueous liquid, that fills a portion, or in some embodiments most, or in some embodiments all, of the sealed lower chamber 40. In some embodiments, the transparent liquid can comprise a mixture of water and other transparent, miscible liquid, for example, glycerin. The content of glycerin, which is a denser liquid than water at room temperature, within the transparent liquid can be selected and adjusted to change the density of the transparent liquid. The lower chamber can be filled completely with the transparent liquid, or mostly, for example, up to about 99%, or up to about 95%, or up to about 90%.

The sealed lower chamber 40 also has a particulate material suspended within the transparent liquid L. In some embodiments, the particulate material is highly-reflective planar glitter pieces 52, each consisting of planar plastic film having an areal patterned shape, and a highly-reflective coating on both planar surfaces of the piece. The rays of light, for example sunlight, that passes through the lure body 10 as described above, also passes through the depth of the transparent liquid L, reflects off of several of the highly-reflective planar glitter pieces 52 suspended within the transparent liquid L, and are visible from the underside through the lower wall portion 16, and through a portion of the opposed side wall portions 14 of the lure body 10. Typically the bulk amount of glitter within the chamber is at least 10%, and up to about 70%, and can be at least 15%, or at least 20%, or at least 25%, or at least 30%, and up to about 60%, or up to about 50%, or up to about 40%, or up to about 30%.

The glitter pieces can consist of glitter flakes, which are pieces of a sheet material having a largest dimension in size, typically a hexagon, of 0.5 mm or more, or can consist of glitter powder, having a largest dimension less than 0.5 mm. or can consist of a mixture thereof. The sheet typically is a thermoplastic material, for example, polyethylene terephthalate, with a thin aluminum layer applied, and coated with a transparent resin such as epoxy, and can be pigmented in a variety of colors. A typical specific density of glitter pieces is about 1.4, relative to water (1.0).

In some embodiments, the content of glycerin provides a transparent liquid density that is the same as, or less than, the density of the particulate material, and more specifically, the highly-reflective planar glitter pieces. If the densities of the transparent liquid and the glitter pieces are equal, the glitter pieces will remain suspended with the transparent liquid, and will neither float to the top surface or sink to the bottom of the transparent liquid unless moved by an outside element, such as a metal stirring ball. Preferably, the density of the transparent liquid is lower than the density of the glitter pieces, so that the glitter pieces will descend more slowly, within the transparent liquid. If the densities are different but very close, the descent might be so slow as to not provide a rapidly-changing reflection pattern, which is more attracting to fish. If the densities are different and very different, the descent might be so quick that there is a smaller window of time with the rapidly-changing reflection pattern. Preferably, a specific density (relative to water at 1.00) of the transparent liquid containing glycerin is about 1.086 to about 1.109 at temperatures between about 0 to 21 degrees Celsius.

The gas-filled upper chamber 30 provides the fish lure 1 with buoyancy that maintains the longitudinal axis 100 of the lure body 10 parallel with the surface of the water body, and ensure that the upper portion of the fish lure 1 floats at or above, and that the longitudinal vertical plane through the lure body 10 is perpendicular to, the surface of the water body.

In various embodiments, the transparent plastic wall 18 of the upper wall portion 12 and/or the opposed side wall portions 14, and the bottom wall portion 16, are uncovered or uncoated, which allows light to pass substantially undiminished in intensity through the lure 1 with minimum diffusion.

Coated with Light-Transparent Windows

The present invention also provides an embodiment of a fish lure as shown in FIGS. 5 and 6, that provides a lure body 110 having a non-transparent or opaque coating 60 that covers at least a portion of the upper areal surface 13 of the lure body 110, and typically some portion of the opposed side surface(s) 15 of the lure body 10, while one or more uncovered portions 65 of the upper areal surface 13 are not covered by the non-transparent coating 60 and allow light to pass though the uncovered portions 65. The uncovered portions 65 provides a light-transparent window in the opaque, non-transparent coating 60. The non-transparent coating 60 can be a paint or film applied to the lure body during manufacture, such as an opaque enamel or other non-water dissolvable paint or an opaque plastic film made of a thermoplastic material. The paint or film can be colored, and provide a pattern of colors and lines to depict a bait fish.

The one or more uncovered portions 65 of the upper areal surface 13 permit light, such as sunlight, to pass through the lure body 10 and the transparent liquid L containing the glitter pieces 52, and be visible from the underside and the opposed sides of the fish lure 1, allowing the sunlight to reflect off the highly-reflective planar glitter pieces 52 despite the presence of the non-transparent coating 60 covering other portions of the upper areal surface 13 of the lure body 110. The uncovered portion 65 is an uncovered elongated stripe 66 extending along the longitudinal centerline 100 of the upper areal surface 13 of the lure body 10. As seen in FIG. 6, the uncovered elongated stripe 66 is only slightly visible or not visible from a side view of the fish lure 1.

The size of the uncovered portion(s) should be sufficient to allow sunlight or ambient light to pass through the upper areal surface of the lure body and down into the transparent liquid containing the glitter pieces. As percentage of the arial footprint of the lure body, such a shown in FIG. 3, the total area of the uncovered portion(s) is at least 5%, or at least 10%, or at least 15%. The total area of the uncovered portion(s) is typically up to 50%, or up to 40%, or up to 30%, of the anal footprint of the lure body. In various embodiments, the total area of the uncovered portion(s) is about 15% to about 35%, or about 20% to about 25%, of the arial footprint of the lure body.

Figures 7, 8:
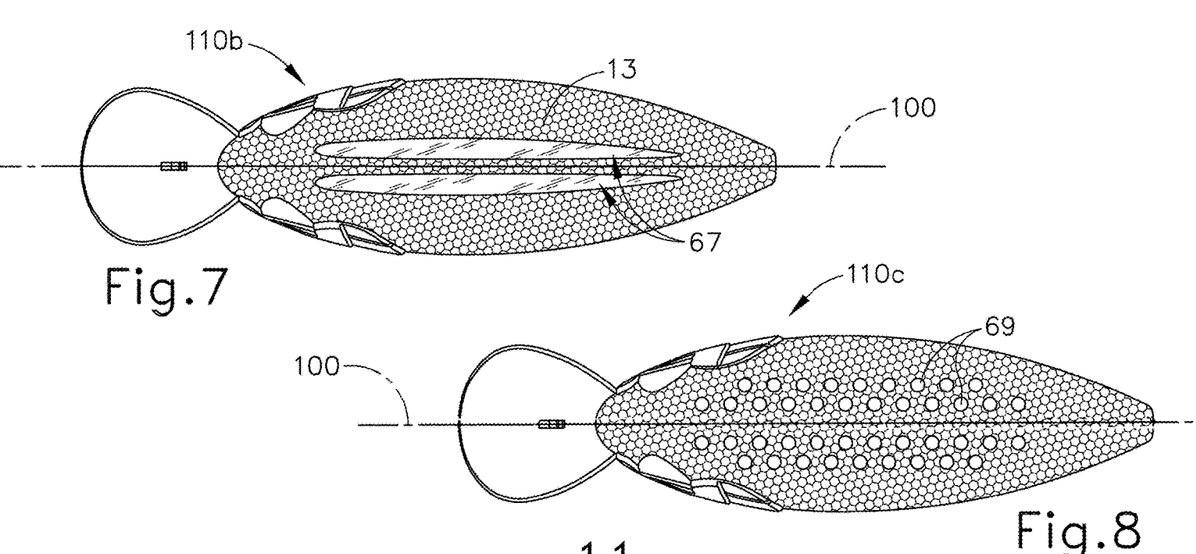
FIG. 7 shows a top plan view of another embodiment of a lure body having a pair of light-transparent windows in an opaque coating.
FIG. 8 shows a top plan view of yet another embodiment of a lure body having a plurality of light-transparent window openings in an opaque coating.

In other embodiments, as shown in FIG. 7, the lure body 110b can have an uncovered portion 65 that consists of one or more, including two, three or more, uncovered elongated stripes 67 positioned on either or both sides of the longitudinal centerline 100 of the upper areal surface 13. The shape of the one or more elongated stripes can be teardrop, rectangular or oval shaped. In some embodiments, the length of the one or more elongated stripes extends about the length of the upper chamber, and is typically at least 50% and up to about 100% the length of the lure body.

In other embodiments, as shown in FIG. 8, the lure body 110c can have an uncovered portion 65 that consists of a plurality of spot areas 69 positioned within the non-transparent coating 60. The spots 69 preferably having an area of an equivalent diameter of less than about 10 mm, and an average equivalent diameter of between 1 mm and 5 mm.

A lure body can be constructed as a single, sealable chamber, that can be filled partially with a transparent liquid, leaving an airspace. In a single-chamber embodiment, the volume of the transparent liquid is at least about 50%, and up to about 95%, of the chamber volume, and more typically at least 60%, or at least 70%, or at least 80%, and up to about 90%, or up to about 80%, or up to about 70%, of the chamber volume.

Figure 9:
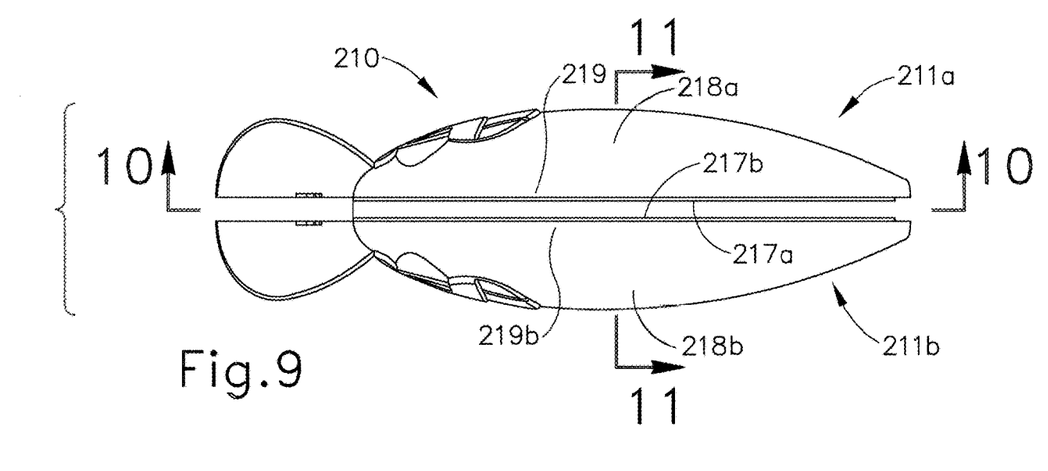
FIG. 9 shows a top plan view of a lure body assembled from two half shells.
Figure 10:
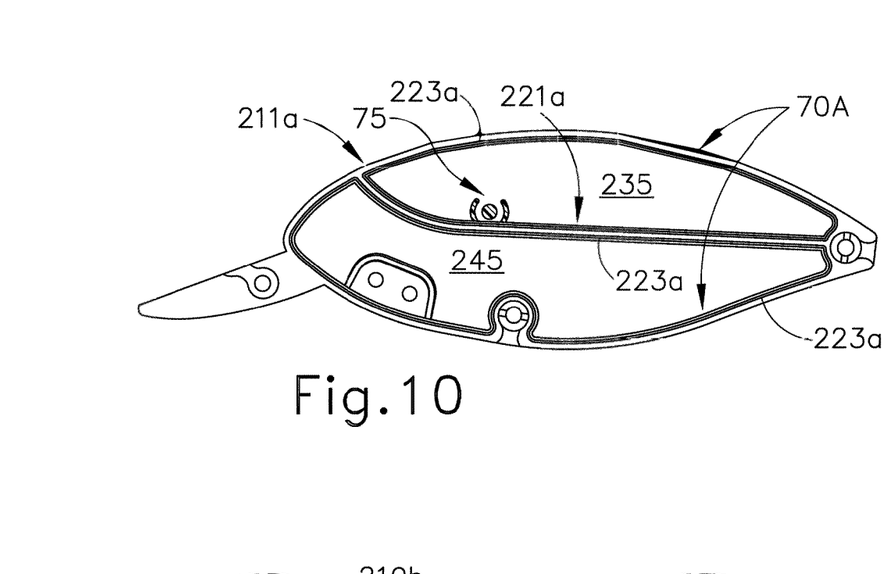
FIG. 10 shows a side view of one of the half shells of FIG. 9.
Figure 11:
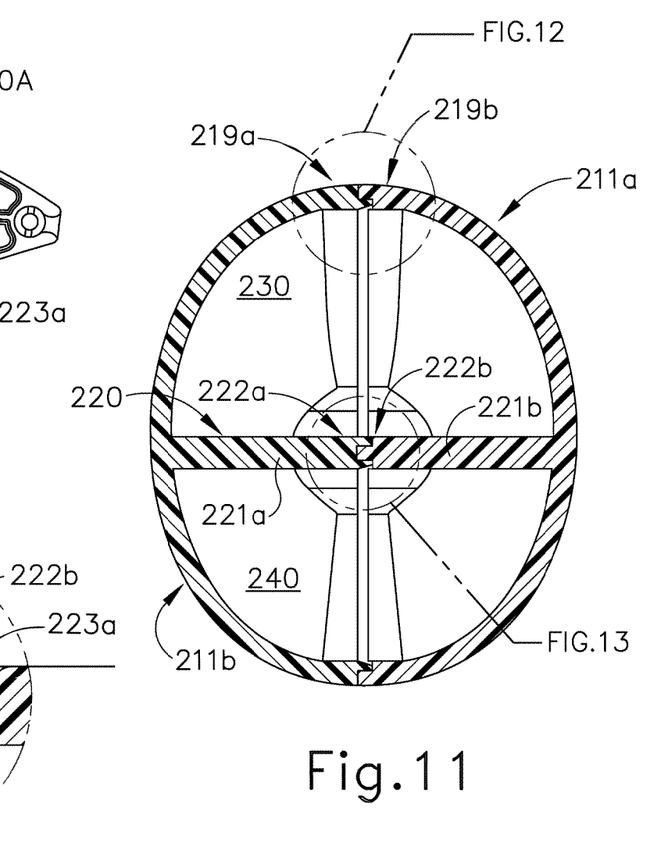
FIG. 11 shows a lateral sectional view of a lure body assembled from two half shells, taken through line 11-11 of FIG. 10.

A lure body 210 can be constructed from two half shells 211a and 211b as shown in FIGS. 9-11, that each have a half shell wall 218a, 218b with a peripheral wall portion 219a, 219b. The peripheral wall portions 219a, 219b are joined and sealed along respective peripheral edges 217a, 217b, shown in detail in FIG. 12, to form the lure body 210 with the one or more sealable or sealed chamber(s) within.

Typically, the first half shell 211*a* and a second half shell 211*b* have a shape and structure that are mirror images.

Each half shell 211*a*, 211*b* also has a dividing half wall 221*a*, 221*b*, with a distal end 222*a*, 222*b* having a distal edge 223*a*, 223*b*. The respective dividing half walls 221*a*, 221*b* divide the main cavity into an upper cavity 235 and a lower cavity 245. The dividing half walls 221*a*, 221*b* are joined and sealed along the respective distal edges 223*a*, 223*b*, shown in detail in FIG. 13, to form a dividing wall 220 that divides the space within the lure body 210 into an upper chamber 230 and a lower chamber 240 (FIG. 11).

Figures 12, 13:
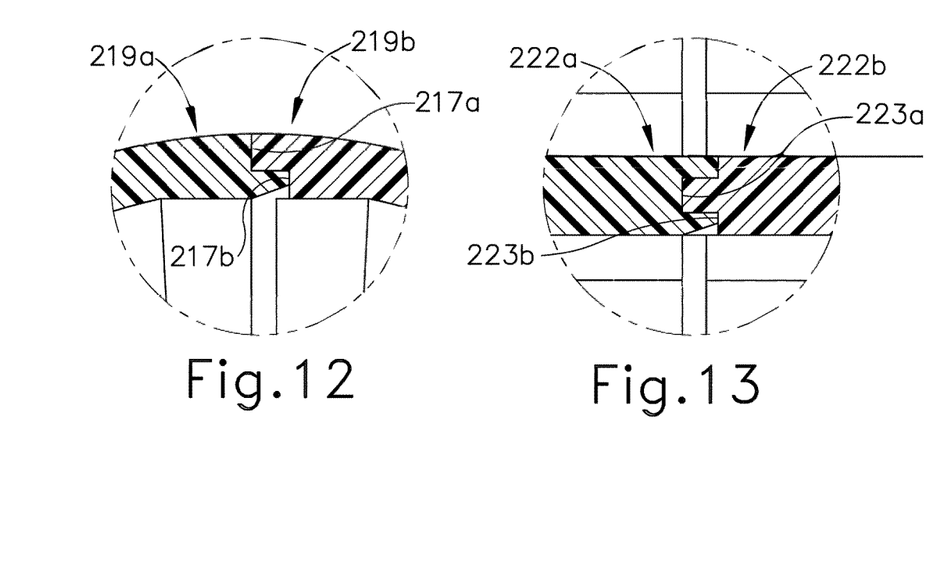
FIG. 12 shows a detailed view of the sealed peripheral edges of the two half shells.
FIG. 13 shows a detailed view of the sealed distal edges of two dividing half walls.

As shown in FIGS. 12 and 13, to improve the sealing together of the peripheral edges 217*a*, 217*b* of the two half shells 211*a*, 211*b*, and of the distal edges 223*a*, 223*b* of the dividing half walls 221*a*, 221*b*, the respective peripheral edges 217*a*, 217*b* and the distal edges 223*a*, 223*b* have mating surfaces that are non-planar, and typically are mating curved or angular surfaces that increase contacting surfaces for bonding of the respective edges, and thus increasing the bonding strength of the seal, particularly the lateral shear strength of the seal. In the illustrated embodiment, the opposed peripheral edges 217*a*, 217*b* and distal edges 223*a*, 223*b* are a tongue-and-groove configuration, which both aids in alignment of the planes of the two peripheral walls, and the bonding strengths of the seal. The seal can be made using an adhesive or a plastic solvent, or by thermal fusion.

The lure body can also include one or more means 70, attachment of suspension lugs and eyelets (not shown), to which an angler can attach a hook, for example of treble hook, lure lines, or other angler elements, as are well known to those skilled in the art.

The lure body can also include one or more sound-producing elements, such as a rattler 75, into a lure body, nonlimiting examples of which are described in U.S. Pat. Nos. 5,070,639, 5,870,850, and 6,202,337, and French Patent 2,888,720. The one or more sound-producing elements 75 can be placed with the lure body, or within either or both the upper chamber and the lower chamber of the lure body.

I claim:

1. A fish lure comprising: (i) a lure body made of a transparent plastic, having an elongated shape, an upper areal surface, and comprising an enclosed chamber; (ii) an opaque coating that covers a portion of the upper areal surface of the lure body, the opaque coating comprising a paint or film and having one or more light-transparent windows where the opaque coating does not cover the upper areal surface, wherein the one or more light-transparent windows are transparent to light; and (iii) a light-transparent liquid contained in the enclosed chamber, and a particulate material comprising a multiplicity of highly-reflective planar glitter pieces, contained within the light-transparent liquid.

2. The fish lure according to claim 1 wherein the one or more light-transparent windows comprise one or more elongated striped areas.

3. The fish lure according to claim 1 wherein the one or more light-transparent windows comprise an elongated stripe along a longitudinal centerline of the upper areal surface of the lure body.

4. The fish lure according to claim 3 wherein a length of the elongated stripe along the longitudinal centerline extends at least 50% and up to about 100% of a length of the lure body.

5. The fish lure according to claim 4 wherein a shape of the elongated stripe along the longitudinal centerline is a teardrop.

6. The fish lure according to claim 3 wherein the opaque coating covers an entirety of the upper areal surface of the lure body, except for the one or more light-transparent windows.

7. The fish lure according to claim 3 wherein the lure body made of the transparent plastic comprises a transparent plastic wall, and the one or more light-transparent windows consists of a portion of the transparent plastic wall that is not covered by the opaque coating, wherein the one or more light-transparent windows allow light to pass substantially undiminished in intensity through the upper areal surface of the transparent plastic wall of the lure body with minimum diffusion.

8. The fish lure according to claim 3 wherein the lure body has a bottom wall portion that is uncovered by an opaque coating, to allow light passing into the lure body through the one or more light-transparent windows to pass through the bottom wall portion.

9. The fish lure according to claim 1 wherein the one or more light-transparent windows comprise a plurality of spot areas each having an equivalent diameter of less than about 10 mm.

10. The fish lure according to claim 1 wherein the light-transparent liquid comprises water and 1%-75% glycerin by volume of the light-transparent liquid.

11. The fish lure according to claim 1, wherein the enclosed chamber comprises an upper chamber that is sealed and contains a gas, and a lower chamber that contains the light-transparent liquid.

12. The fish lure according to claim 11, wherein a light-transparent, transverse wall divides the enclosed chamber into the upper chamber and the lower chamber.

13. The fish lure according to claim 12, wherein the upper chamber extends along a length of the lure body to provide a same buoyancy at a front end and a back end of the lure body.

14. The fish lure according to claim 12 wherein the elongated shape of the lure body has a shape having a vertical plane of symmetry along a length of the lure body.

15. The fish lure according to claim 14 wherein the lure body consists of a first half shell and a second half shell that is a mirror image of the first half shell, each half shell comprising a half shell wall that includes a peripheral edge that defines a main cavity, and a dividing half wall that is joined along a portion of an interior surface of the half shell wall, and has a distal edge, and that divides the main cavity into an upper cavity and a lower cavity, wherein the respective peripheral edges of the half shell walls of the first half shell and second half shell have surfaces that are sealed together to form the enclosed chamber, and the respective distal edges of the dividing half walls have surfaces that are sealed together to form the light-transparent, transverse wall that divides the enclosed chamber into the upper chamber and the lower chamber.

16. The fish lure according to claim 15 wherein the surfaces of the respective peripheral edges of the half shell walls have mating surfaces and the surfaces of the respective distal edges of the dividing half walls have mating surfaces.

17. The fish lure according to claim 16 wherein the lower chamber is sealed and contains the light-transparent liquid filling up to about 99% of the sealed lower chamber.

18. The fish lure according to claim 11, further comprising one or more sound-producing elements placed within the upper chamber of lure body.

19. The fish lure according to claim 1 wherein the paint comprises a colored enamel or other non-water dissolvable paint, and the film comprises a colored plastic film made of a thermoplastic material.

20. The fish lure according to claim 1 wherein the lure body made of the transparent plastic comprises a transparent plastic wall, and the one or more light-transparent windows consists of a portion of the transparent plastic wall that is not covered by the opaque coating, wherein the one or more light-transparent windows allow light to pass substantially undiminished in intensity through the upper areal surface of the transparent plastic wall of the lure body with minimum diffusion.

21. The fish lure according to claim 1 wherein the lure body has a bottom wall portion that is uncovered by an opaque coating, to allow light passing into the lure body through the one or more light-transparent windows to pass through the bottom wall portion.

\* \* \* \* \*

UNITED STATES PATENT AND TRADEMARK OFFICE
CERTIFICATE OF CORRECTION

| | | |
|---|---|---|
| PATENT NO. | : 11,930,796 B1 | Page 1 of 1 |
| APPLICATION NO. | : 18/122576 | |
| DATED | : March 19, 2024 | |
| INVENTOR(S) | : Daniel Edward Graf | |

It is certified that error appears in the above-identified patent and that said Letters Patent is hereby corrected as shown below:

In the Specification

Column 1, Line 19, delete "steles" and insert --styles--.

Column 6, Line 33, delete "anal" and insert --arial--.

Signed and Sealed this
Twenty-third Day of April, 2024

Katherine Kelly Vidal
*Director of the United States Patent and Trademark Office*